(12) United States Patent
Van Mook et al.

(10) Patent No.: US 11,875,918 B2
(45) Date of Patent: Jan. 16, 2024

(54) ELECTRICAL FEEDTHROUGH SYSTEM AND METHODS OF USE THEREOF

(71) Applicant: FMC Technologies, Inc., Houston, TX (US)

(72) Inventors: Erik Van Mook, Houston, TX (US); Matthew Keller, Houston, TX (US); David Hilbeck, Houston, TX (US); John Johansen, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 17/612,406

(22) PCT Filed: Jun. 19, 2020

(86) PCT No.: PCT/US2020/038683
§ 371 (c)(1),
(2) Date: Nov. 18, 2021

(87) PCT Pub. No.: WO2020/257614
PCT Pub. Date: Dec. 24, 2020

(65) Prior Publication Data
US 2022/0238258 A1 Jul. 28, 2022

Related U.S. Application Data

(60) Provisional application No. 62/864,717, filed on Jun. 21, 2019.

(51) Int. Cl.
*H01B 17/30* (2006.01)
(52) U.S. Cl.
CPC .................... *H01B 17/30* (2013.01)
(58) Field of Classification Search
CPC .... H01B 17/30; H01R 13/523; E21B 33/0385
See application file for complete search history.

(56) References Cited

U.S. PATENT DOCUMENTS

| 3,508,188 A | 4/1970 | Buck | |
|---|---|---|---|
| 2004/0266240 A1* | 12/2004 | Abbey | H01R 13/523 439/201 |

(Continued)

FOREIGN PATENT DOCUMENTS

| EP | 2940242 P | 11/2015 |
|---|---|---|
| WO | 2015068050 A1 | 5/2015 |

OTHER PUBLICATIONS

International Search Report issued in International Application No. PCT/US2020/038683 dated Sep. 29, 2020 (4 pages).

(Continued)

*Primary Examiner* — Paresh Paghadal
(74) *Attorney, Agent, or Firm* — Osha Bergman Watanabe & Burton LLP

(57) ABSTRACT

An electrical feedthrough assembly may include a lower assembly and an upper assembly coupled together. The lower assembly may include an outer body with a lower housing and an upper housing disposed within a bore of the outer body, and a first conductor extending from the lower housing to the upper housing. Additionally, the upper assembly may include an outer body with a pin end, the pin end is inserted into an opening of the lower assembly, a main body connected to the outer body, a second conductor disposed within the main body, a channel in the outer body open to an outside of the outer body and a chamber within the outer body, a piston disposed within the channel and configured to fluidly isolate the chamber from the outside of the outer body, and a dielectric fluid provided within the chamber.

13 Claims, 5 Drawing Sheets

(56) References Cited

U.S. PATENT DOCUMENTS

| | | |
|---|---|---|
| 2014/0097001 A1 | 4/2014 | Campbell et al. |
| 2016/0006161 A1* | 1/2016 | Ranalli et al. |
| 2016/0276775 A1* | 9/2016 | Nicholson .............. H01R 13/17 |
| 2017/0179635 A1* | 6/2017 | Painter ..................... H02G 3/22 |
| 2019/0044256 A1* | 2/2019 | Gelderd ............. H01R 13/2421 |

OTHER PUBLICATIONS

Written Opinion issued in International Application No. PCT/US2020/038683 dated Sep. 29, 2020 (7 pages).

Office Action issued in European Application No. 20737766.4, dated Apr. 6, 2023 (6 Pages).

* cited by examiner

ELECTRICAL FEEDTHROUGH SYSTEM AND METHODS OF USE THEREOF

FIELD OF THE DISCLOSURE

Embodiments disclosed herein relate generally to subsea oil and gas operations equipment. More specifically, embodiments disclosed herein relate to systems and methods of use for an electrical feedthrough to provide power to subsea equipment.

BACKGROUND

In oil and gas, subsea operations may be performed in waters offshore at great depths. In order to recover hydrocarbons from a well, any number of electrical systems may be deployed on the seabed to perform subsea operations. Many of these electrical systems need high-reliability power grids and power control units located on the seabed, offshore rig, and/or buoyant devices to power various devices. Power systems play a major role in providing the required and reliable power to the various electrical systems. However, there are many challenges for deploying power components under the seabed such as the requirements of power system components operating in subsea environment, use of electronics for efficient transmission of power from the offshore platform or from the shore to the subsea electrical loads, variable speed drive systems, and research areas related to power electronics for subsea electrical systems.

In conventional methods, power is provided from external sources to the subsea devices via cable conductors to submerged process control equipment, pumps and compressors, transformers, motors, and other electrically operated equipment. As these components are disposed subsea and are typically enclosed and protected by water-proof pressure vessels, power is provided by means of a cable termination and connector, which may be an electrical penetrator, designed to penetrate and provide power through a subsea tree.

As described above, the installation and operation of subsea electrical systems have various challenges. Pressure increases about 10 bar (about 145 PSI) for every 100 m depth in the ocean, and thus, for electrical systems needing to be located at a water depth of about 3000 m, the electrical systems encounters about 300 bar pressure. At these depths, all the electrical components have to be designed and qualified to withstand high pressures. Additionally, sea water is a conductor and corrosive, hence proper isolation between the electrical equipment and the sea water needs to be provided. As the equipment is located at depths of up to 3,000 m, in the event of fault, maintenance will be a challenge and will not be possible without bringing the equipment to the surface. However, bringing the equipment to surface is expensive and can result in long production outages. In some instances, the reliability of the equipment for the subsea applications has to be designed for more than 20 years.

Typically, electrical power for the subsea operations is generated in two different ways, one being offshore power generation and the other is onshore generating station. In the case of offshore power generation, gas turbine driven generators may be installed on the platforms. In the case of onshore generating stations, subsea devices such as electric submergible pumps ("ESP") and compressors are located very far from the onshore generating stations, and requires a long tieback power transmission system. Further, using high power high voltage AC transmission systems may minimize the power losses, and the reactive power due to the large capacitance of the power umbilical. In addition, the long distance high power and high voltage transmission/distribution require strong power cables with good insulation capability. The power umbilical can be fully electric or multiplexed wherein both electrical and hydraulic lines are combined to feed power from the power generator to the subsea device.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the embodiments disclosed herein relate to an electrical feedthrough assembly. The electrical feedthrough assembly may include a lower assembly having a first end and a second end, and the lower assembly may include: an outer body with a lower housing and an upper housing disposed within a bore of the outer body, the lower housing extends axially outward from the outer body to form the first end, the upper housing extends axially outward from the outer body to form the second end, and a first conductor extending from the lower housing to the upper housing, wherein at least one portion of the first conductor is enclosed in a first insulator. Additionally, the electrical feedthrough assembly may include an upper assembly having a first end and a second end and the upper assembly may be coupled to the lower assembly. The upper assembly may include: an outer body with a pin end at the first end, wherein the pin end is inserted into an opening at the second end of the lower assembly, a main body connected to the outer body, a second conductor disposed within the main body, wherein at least one portion of the second conductor is enclosed in a second insulator, a channel in the outer body open to an outside of the outer body and a chamber within the outer body, a piston disposed within the channel and configured to fluidly isolate the chamber from the outside of the outer body, and a dielectric fluid provided within the chamber. The piston may be movable within the channel in response to a pressure differential between the dielectric fluid and the outside of the outer body.

In another aspect, the embodiments disclosed herein relate to a method. The method may include connecting a first end of a lower assembly of an electrical feedthrough assembly to a tubing hanger assembly; inserting a pin end at a first end of an upper assembly of the electrical feedthrough assembly into a second end of the lower assembly; passing a first conductor of the lower assembly through the pin end and into the upper assembly to conductively connect to a second conductor of the upper assembly, wherein passing the first conductor into the upper assembly displaces fluid within a chamber in the upper assembly; actuating a piston through a single body of the upper assembly from the displaced fluid; connecting a second end of the upper assembly to a subsea tree; connecting the second conductor to a power source; powering subsea devices conductively through the electrical feedthrough assembly.

Other aspects and advantages will be apparent from the following description and the appended claims.

DETAILED DESCRIPTION

Figure 1:
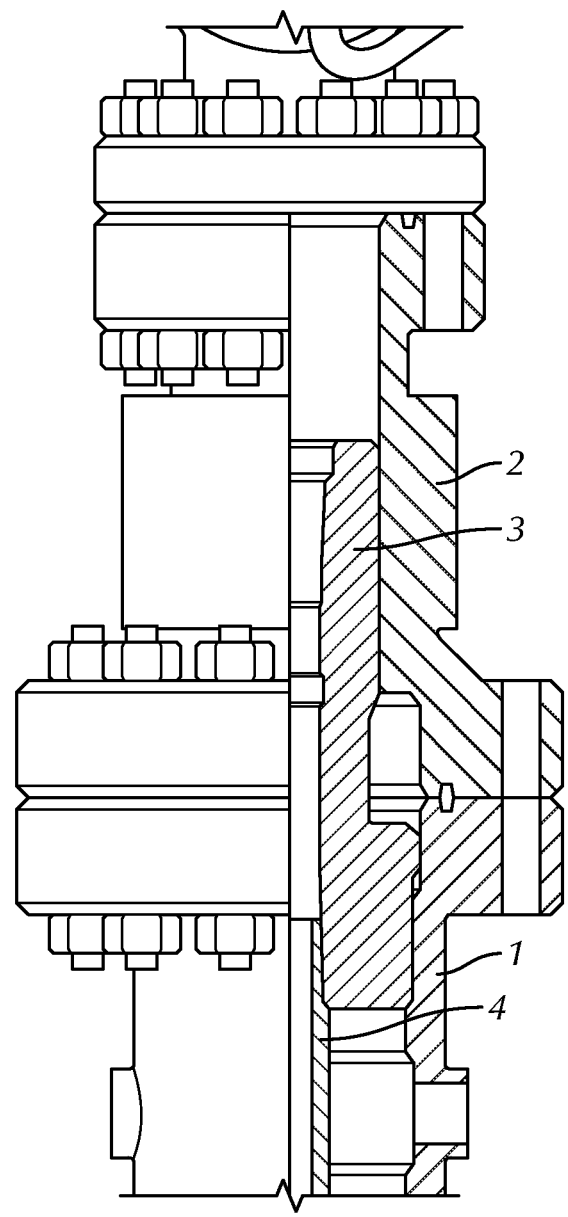
FIG. 1 is a perspective view of a wellhead in accordance with one or more embodiments of the prior art.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

As used herein, the terms "coupled" or "coupled to," "connected" or "connected to," or "attached" or "attached to" may indicate establishing either a direct or indirect connection, and is not limited to either unless expressly referenced as such. Wherever possible, like or identical reference numerals are used in the figures to identify common or the same elements. The figures are not necessarily to scale and certain features and certain views of the figures may be shown exaggerated in scale for purposes of clarification.

In addition, any terms designating tree or tubing head (e.g., any wellheads or tubing hanger) at a rig type (i.e., any land rig or offshore rig) should not be deemed to limit the scope of the disclosure. As used herein, fluids may refer to slurries, liquids, gases, and/or mixtures thereof.

It is to be further understood that the various embodiments described herein may be used in various stages of a well, such as rig site preparation, drilling, completion, abandonment etc., and in other environments, such as workover rigs, fracking installation, well-testing installation, oil and gas production installation, without departing from the scope of the present disclosure. It is recognized by the different embodiments described herein that a tree or tubing head plays a valuable and useful role in the life of a well. Further, it is recognized that electrical feedthrough assembly configuration and arrangement of components for providing electrical power to subsea devices according to one or more embodiments described herein may provide a cost-effective alternative to conventional systems. The embodiments are described merely as examples of useful applications, which are not limited to any specific details of the embodiments herein.

In one aspect, embodiments disclosed herein relate to an electrical feedthrough assembly, which may include an electrical conductor that may be used to provide power to subsea devices, for example. The electrical feedthrough assembly may also be interchangeably referred to as an electrical penetrator assembly in the present disclosure. According to embodiments of the present disclosure, the electrical feedthrough assembly is an apparatus that may include a lower assembly and an upper assembly coupled together. In a non-limiting example, a pin end of the upper assembly is inserted into an opening of the lower assembly to conductively connect a conductor of the lower assembly to a conductor of the upper assembly. One skilled in the art will appreciate that by conductively connecting the conductor of the lower assembly to the conductor of the upper assembly, power is able to be provided through the electrical feedthrough assembly.

Electrical feedthrough assemblies of the present disclosure may be connected to, for example, wellheads to provide power through the wellhead to down hole equipment. Referring to FIG. 1, FIG. 1 illustrates wellhead 1 in accordance with one or more embodiments of the prior art. Wellheads are well known in the art, and thus, a brief overview is given to help provide a general view of the embodiments disclosed herein. The wellhead 1 includes a tubing head 2 disposed on the wellhead 1. Additionally, the tubing head 2 contains a tubing hanger assembly 3 for engaging down hole equipment (not shown). Furthermore, the wellhead and the tubing head 2 may include a port 4 to perform various wellbore and annulus operations. One with ordinary skill in the art would understand that FIG. 1 illustrates one example of a wellhead; however, the wellhead 1 may take any form (i.e., number of components, shape, or size) known in the art without departing from the scope of the present disclosure.

Figure 2:
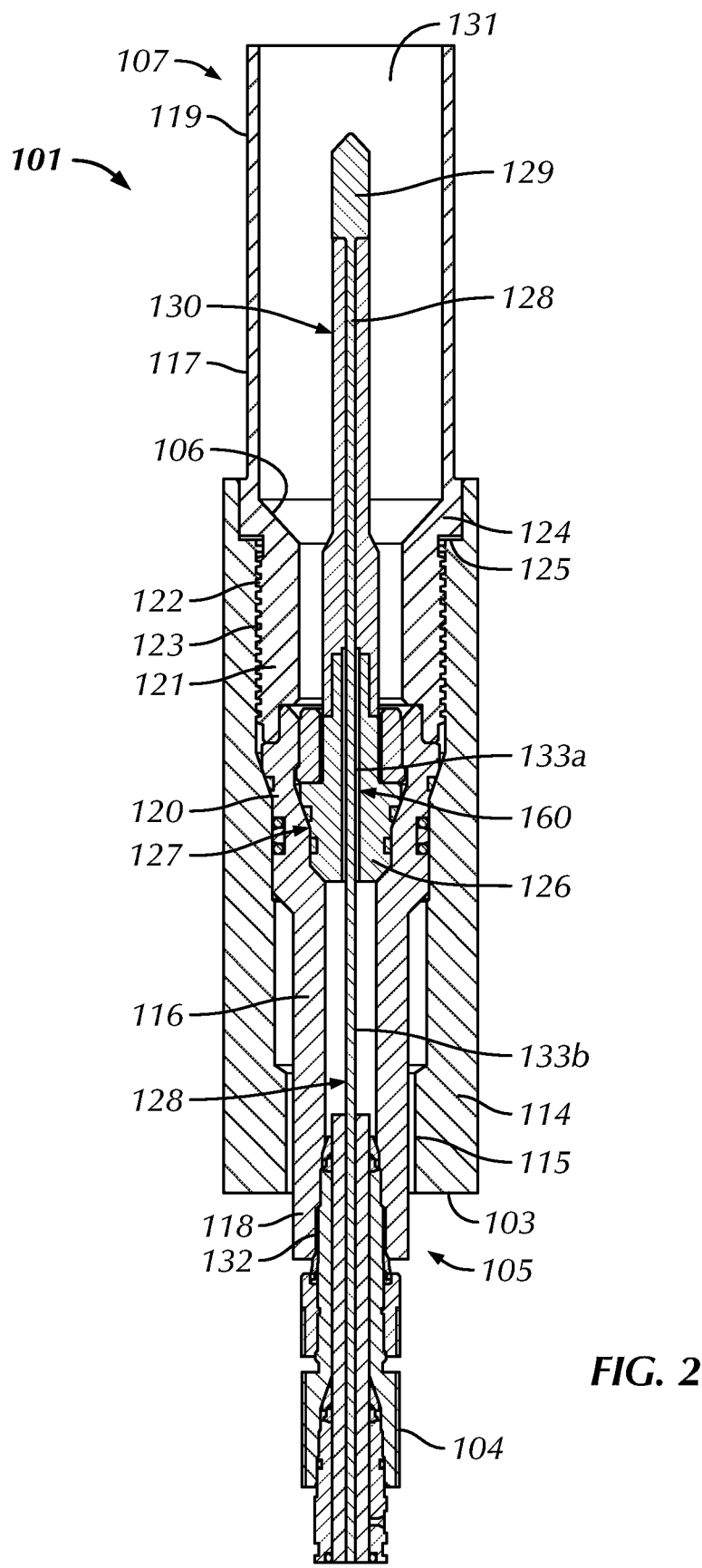
FIG. 2 is a cross-sectional view of a lower assembly of an electrical feedthrough assembly in accordance with one or more embodiments of the present disclosure.

Now referring to FIG. 2, in one or more embodiments, FIG. 2 illustrates a cross-sectional view of the lower assembly 101 of an electrical feedthrough assembly in accordance with the present disclosure. The lower assembly 101 may include an outer body 114 with a bore 115, such as a metal sub. It is further envisioned that the outer body 114 may be made integral to a tubing hanger. In some embodiments, a lower housing 116 and an upper housing 117 may be disposed in the bore 115. The lower housing 116 and the upper housing 117 may be made from metal. It is further envisioned that a lower end 118 of the lower housing 116 and an upper end 119 of the upper housing 117 may extend outside the bore 115 to form a first end 105 and a second end 107 of the lower assembly 101, respectively.

Furthermore, a first ferrule connector 104 may be inserted into an opening 132 at a first end 105 of the lower housing 116. According to embodiments of the present disclosure, a ferrule connector may be a twin ferrule connector or a triple ferrule connector such as Halliburton's FMJ connector. In some embodiments, an opening 131 of the upper housing 117 may be exposed to a surrounding environment. The opening 131 may have an internal load shoulder 106. In addition, an upper end 120 of the lower housing 116 may be coupled to a lower end 121 of the upper housing 117. Further, the lower end 121 of the upper housing 117 may be threaded onto an outer surface 122 to connect to threads 123 in the bore 115. It is further envisioned that the upper housing 117 may have protrusions 124 extending outwardly to land on an inner load shoulder 125 of the outer body 114.

Still referring to FIG. 2, in one or more embodiments, an electrical penetrator 126 may be disposed at the upper end 120 of the lower housing 116. In a non-limiting example, the electrical penetrator 126 may include optics or ceramic to enable electrical transmission. Additionally, a metal-to-metal seal 127 may be inserted between the electrical penetrator 126 and the lower housing 116. As further shown in FIG. 2, the conductor 128 may extend a length of the lower assembly 101 to extend past the first end 105 into a tubing hanger assembly of a wellhead and connect to subsea devices. In a non-limiting example, the conductor 128 may be a wire or a shaft made of a material consisting of copper, gold, silver, aluminum, nickel-cobalt or any combinations thereof. It is further envisioned that the conductor 128 may have a conductor connector 129 attached thereof in the upper housing 117. One skilled in the art will appreciate how the conductor 128 may have an insulating molding 130, such as a polyether ether ketone ("PEEK") molding, surrounding a length of the conductor 128 to environmentally isolate the conductor 128. Further, glass bodies (133a, 133b) may be disposed around portions of the conductor 128 and glass-to-metal seals 160 may be inserted between the glass bodies (133a, 133b) and metal housings (e.g., the electrical penetrator 126). While it is noted that FIG. 2 shows two glass bodies (133a, 133b), one of skill in the art would understand that this is merely a non-limiting example and any number of glass bodies may be used without departing from the present scope of the disclosure.

Figure 3:
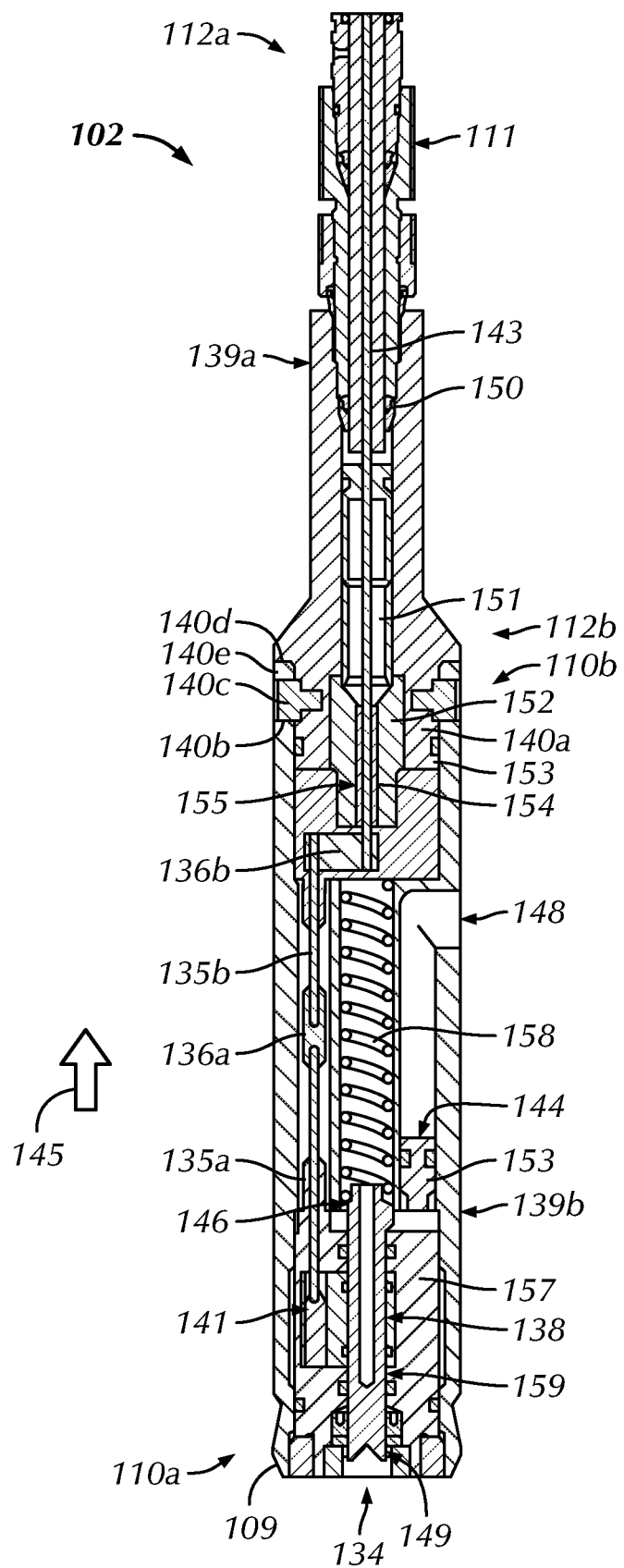
FIG. 3 is a cross-sectional view of an upper assembly of an electrical feedthrough assembly in accordance with one or more embodiments of the present disclosure.

Now referring to FIG. 3, in one or more embodiments, FIG. 3 illustrates a cross-sectional view of the upper assembly 102 of the electrical feedthrough assembly in accordance with the present disclosure. The upper assembly 102 may have a main body 139a connected to an outer body 139b. In a non-limiting example, the outer body 139b may be threaded and sealed to the main body 139a or the outer body 139b and the main body 139a may be welded together. In some embodiments, the outer body 139b and the main body 139a may be formed as one intergraded body. The outer body 139b may extend from a first end 110a to a second end 110b. The main body 139a may extend from a first end 112a to a second end 112b. In a non-limiting example, second end 112b of the main body 139a is coupled to the second end 110b of the outer body 139b. It is further envisioned that the main body 139a may have an extension 140a at the second end 112b inserted into a slot 140b of the outer body 139b at the second end 110b. At least one torque connection 140c may be provided to couple the extension 140a and the slot 140b together. In addition, a shoulder 140d at the second end 112b of the main body 139a may land on a load shoulder 140e at the second end 110b of the outer body 139b. Furthermore, a second ferrule connector 111 (e.g., a twin ferrule connector or a triple ferrule connector) may be inserted into an opening 150 of the upper assembly 102 at the second end 112 to be connected to a subsea tree connector of a subsea tree.

According to embodiments of the present disclosure, one or more pistons may be provided within a single body of an electrical feedthrough assembly. For example, as shown in FIG. 3, one or more pistons 144, such as a pressure compensation piston, may be provided within the outer body 139b. In some embodiments, one piston may be housed within a single body. In some embodiments, more than one piston (e.g., up to 5 pistons) may be housed within a single body (e.g., the outer body 139b). In embodiments having more than one piston within a single body of the electrical feedthrough assembly, the pistons may have comingled compensating volumes (e.g., provided in a single chamber), or each piston may have independent compensated volumes.

The piston 144 may travel through a channel in communication at one end with an opening 148 through the outer body 139b to the outer environment surrounding the electrical feedthrough assembly and at an opposite end with a chamber 146. The chamber 146 may be filled and sealed with a dielectric fluid (or gas) to fluidly isolate electrical components within the outer body 139b and keep the piston 144 lubricated. In a non-limiting example, the dielectric fluid may be selected from the group of transformer oils, perfluoroalkanes, and purified waters. The chamber 146 may be in fluid communication with one side of the piston 144 in the channel, with one or more seals on the piston, such as an O-ring, isolating the dielectric side of the piston 144 from the opposite side of the piston 144, which is exposed to the outer environment. The piston 144 may act as a pressure compensator for the dielectric fluid in the chamber 146, moving within the channel to balance the pressure within the dielectric fluid in the chamber 146 with the ambient pressure in the outer environment.

In a non-limiting example, a shuttle pin 159 may be provided within the outer body 139b and may axially move between an upper position at least partially within the chamber 146 and a lower position proximate the pin end 134 of the outer body 139b. In the embodiment shown in FIG. 3, the shuttle pin 159 may move into a lower position through a channel formed through a block 157 disposed at the pin end 134 of the outer body 139b. The chamber 146 may further include a spring 158 axially adjacent to the shuttle pin 159, such that when the shuttle pin 159 axially moves into the chamber 146, the spring 158 is in a compressed position, and when the shuttle pin 159 axially moves out of the chamber 146 toward a pin end 134 of the outer body 139b, the spring 158 is in an expanded position. The shuttle pin 159 and spring 158 may be isolated from an opening 148 to the outer environment around the electrical feedthrough assembly by the piston 144. Locating the spring 158 within the dielectric fluid within the chamber 146, isolated from the outer environment, may increase the longevity of the connection and reduce fatigue, corrosion and other problems encountered through such exposure.

Further, a conductor connector 138 may be disposed within the block 157 near the pin end 134 in a position that is adjacent to the shuttle pin 159 when the shuttle pin is in a lower position and is exposed when the shuttle pin is in an upper position at least partially within the chamber 146. The conductor connector 138 may be in communication with at least one wire (e.g., first wire 135a) extending through the upper assembly 102. One or more seals, such as wiper seals, may engage with the shuttle pin 159 on either side of the conductor connector 138 to ensure that the chamber 146 and the dielectric fluid contained within are isolated from the outer environment around the shuttle pin 159.

According to embodiments of the present disclosure, the process of assembling the upper assembly 102 to the lower assembly 101 may move the shuttle pin 159 to an upper position at least partially within the chamber 146, such that the spring 158 is in a compressed position and the conductor connector 138 is exposed to the shuttle pin chamber. In the assembly process, the conductor connector 129 of the lower assembly 101 may push the shuttle pin 159 in the upper assembly 102 upward to the upper position. When the shuttle pin 159 is pushed upward and the conductor connector 138 is exposed to the shuttle pin chamber, the conductor connector 129 of the lower assembly 101 may then contact the conductor connector 138, thereby forming a conductive pathway between the lower and upper assemblies 101, 102. Movement of the shuttle pin 159 into the chamber 146 may displace some of the dielectric fluid within the chamber 146, thereby increasing pressure within the chamber 146. The piston 144 may move within the channel to accommodate this pressure change and maintain pressure balance between the dielectric fluid and the outer environment. Likewise, movement of the shuttle pin 159 out of the chamber 146 may cause a pressure change that can be accommodated by the piston 144.

In the embodiment shown, the channel through which the piston 144 moves may have a first opening 148 to the surrounding environment and a second opening at an opposite end from the first opening 148 opening to the chamber 146. Further, the channel may have a straight portion through which the piston 144 may move and at least one elbow connecting the straight portion to the first opening 148. An elbow in the channel may further act to prevent the piston 144 from leaving the channel through the first opening 148 to the surrounding environment.

One or more sealing elements may be provided at the pin end 134 of the upper assembly 102 to seal the conductive elements within the electrical feedthrough assembly from the surrounding environment. For example, the pin end 134 may include one or more elastomer seals 149 fitted between the shuttle pin 159 and the block 157 through which the shuttle pin travels to ensure that the conductor connector 138 is sealed within the pin end 134 of the outer body 139b. Further, when the upper assembly 102 is inserted into the lower assembly 101, an end face 109 of the pin end 134 may abut against the internal load shoulder (see 106 in FIG. 2) in the opening of the lower assembly.

In some embodiments, the conductor connector 138 may be surrounded by a non-conductive insert 141 to environmentally and thermally insulate the conductor connector 138. In addition, the piston 144 may actuate to move in an upward direction (see block arrow 145) such that that the conductor connector 129 of the lower assembly 101 contacts the conductor connector 138 of the upper assembly 102. A first wire 135a of the upper assembly 102 engages a second wire 135b through a first electrical contact 136a. Further, a second electrical contact 136b may electrically connect the second wire 135b to a conductor 143 of the upper assembly 102. While it is noted that FIG. 3 shows two electrical contacts (136a, 136b), one of skill in the art would understand that this is merely a non-limiting example and any number of electrical contacts may be used without departing from the present scope of the disclosure. In a non-limiting example, the conductor 143 may be a wire or a shaft made of a material consisting of copper, gold, silver, aluminum, nickel-cobalt or any combinations thereof.

Still referring to FIG. 3, in one or more embodiments, an electrical penetrator 152 may be disposed at an area near the second end 112b of the main body 139a. In a non-limiting example, the electrical penetrator 152 may include optics or ceramic to enable electrical transmission. Additionally, a metal-to-metal seal 153 may be inserted in both the main body 139a and the outer body 139b between various internal components. As further shown in FIG. 3, the conductor 143 may extend a length through the main body 139a and the outer body 139b. Further, the conductor 143 extends out from the second ferrule connector 111 to be attached to a power source from a subsea tree. One skilled in the art will appreciate how the conductor 143 may have an insulating molding 151, such as a polyether ether ketone ("PEEK") molding, surrounding a length of the conductor 143 to environmentally isolate the conductor 143. Further, glass bodies 154 may be disposed around portions of the conductor 143 and a glass-to-metal seal 155 may be formed between the glass bodies 154 and metal housings (e.g., the electrical penetrator 152).

Figure 4:
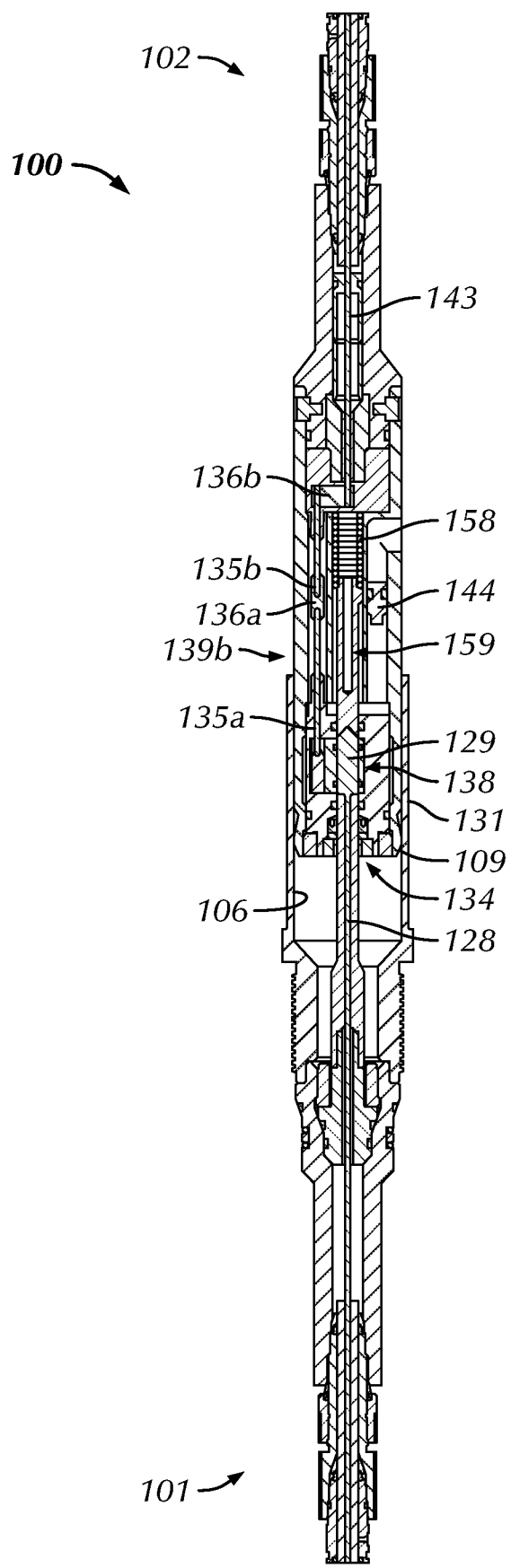
FIG. 4 is a cross-sectional view of an electrical feedthrough assembly in accordance with one or more embodiments of the present disclosure.

Referring to FIG. 4, in one or more embodiments, an electrical feedthrough assembly 100 may be assembled by connecting the lower assembly 101 and the upper assembly 102, as described in FIGS. 2 and 3. In a non-liming example, the upper assembly 102 may be coupled to the lower assembly 101 such that the outer surface of the pin end 134 abuts and is flush against the internal wall within the opening 131 of the lower assembly 102. Further, the pin end 134 of the upper assembly 102 may be inserted into the opening 131 of the lower assembly 101 such that the conductor 128 of the lower assembly 101 is conductively connected to the conductor 143 of the upper assembly 102. When the upper assembly 102 is coupled to the lower assembly 101 and conductors 128, 143 are conductively connected, the conductor connector 129 of the conductor 128 in the lower assembly 101 extends past the pin end 134 to be inserted into the upper assembly 102, and the conductor connector 129 of the conductor 128 of the lower assembly 101 may contact the conductor connector 138 of the upper assembly 102.

FIG. 4 also illustrates that the first wire 135a of the upper assembly 102 engages the second wire 135b through the first electrical contact 136a. In addition, the second electrical contact 136b may electrically connect the second wire 135b to the conductor 143 of the upper assembly 102. One skilled in the art will appreciate that by coupling the lower assembly 101 to the upper assembly 102 and having the electrical contacts 136a, 136b and the wires 135a, 135b conductively connecting each of the conductors 128, 143, a continuous conductor is formed within the electrical feedthrough assembly 100. With the continuous conductor being formed, power may be provided through the electrical feedthrough assembly 100.

One skilled in the art will appreciate how the piston may be automatically actuated from the pressure of coupling the upper assembly 102 to the lower assembly 101. In a non-limiting example, the shuttle pin 159 in the upper assembly 102 may be pressed up into an upper assembly chamber by a force from the conductor connector 129 entering the pin end 134. Movement of the shuttle pin 159 into the upper assembly chamber may displace fluid from within the chamber into a fluidly connected piston channel formed in the upper assembly outer body 139b. Further, movement of the shuttle pin 159 into the upper assembly chamber may compress a spring 158 provided within the chamber.

Accordingly, when an electrical feedthrough assembly according to embodiments of the present disclosure is assembled (e.g., the upper assembly 102 is connected to the lower assembly 101 as shown in FIG. 4), a conductor connector from the lower assembly may be in contact with an upper assembly conductor, a shuttle pin may be positioned at least partially within an upper assembly chamber, and a piston held within an outer body channel may be in a displaced position. Further, in embodiments having a spring disposed in the upper assembly chamber, the spring may be in a compressed position, being compressed between the shuttle pin and chamber wall. Prior to an electrical feedthrough assembly of the present disclosure being assembled, such as shown in FIGS. 2 and 3, the shuttle pin may be positioned proximate the pin end of the upper assembly and may entirely cover an exposed surface of a conductor connector of the upper assembly. Further, prior to being assembled, the piston held within the outer body channel may be in an initial position proximate to an opening between the chamber and channel.

According to embodiments of the present disclosure, the distance the piston moves from an initial position in the channel to a displaced position in the channel may be related to the amount of fluid within the chamber that is displaced by movement of the shuttle pin from connection of the upper assembly to the lower assembly. For example, fluid may be sealed within the fluidly connected chamber and channel system (e.g., using seals around the piston and shuttle pin to inhibit fluid from leaking past the piston and shuttle pin) such that the volume of fluid displaced from movement of the shuttle pin may be substantially proportional to the distance the piston moves.

Figure 5:
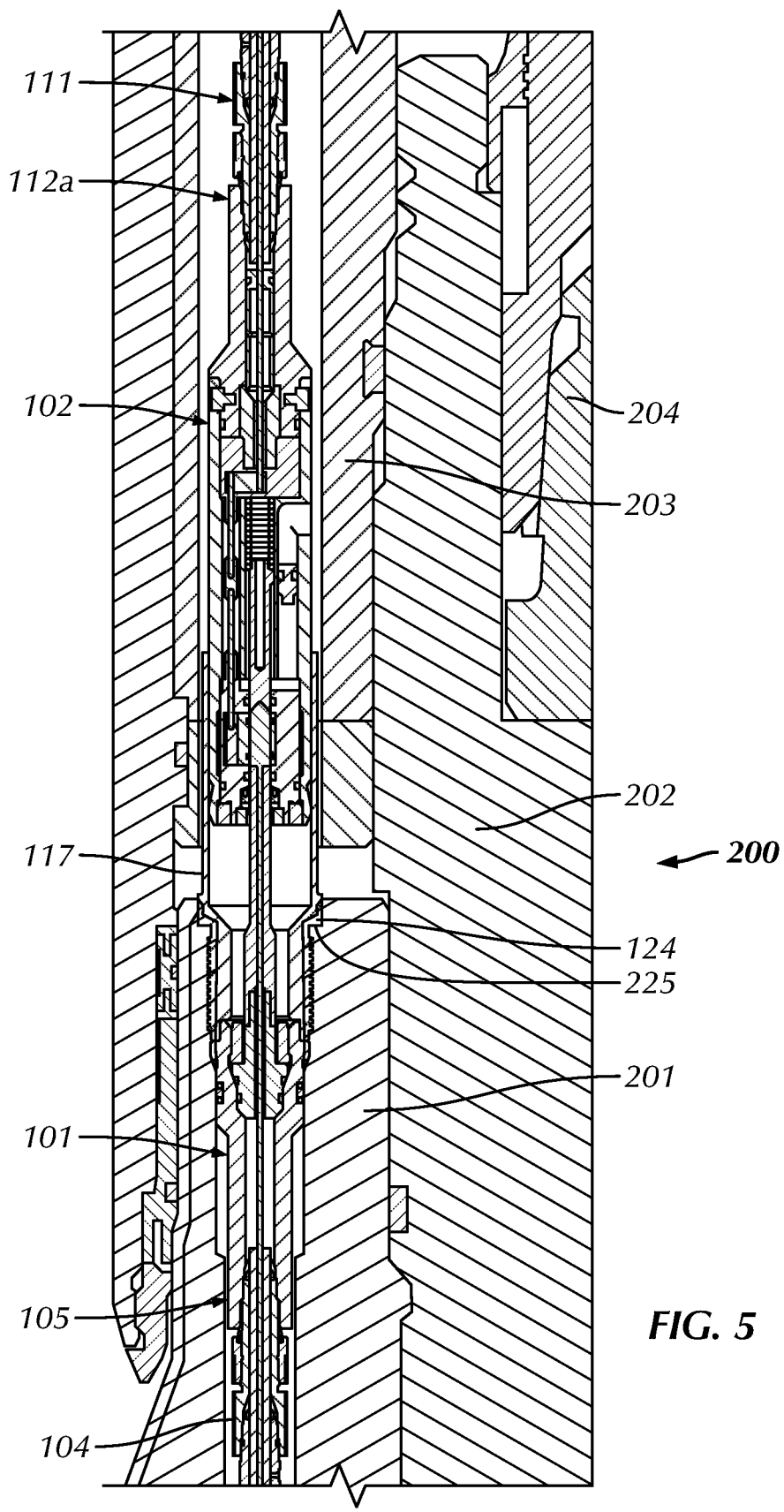
FIG. 5 is a cross-sectional view of an electrical feedthrough assembly connected to a tubing hanger assembly in accordance with one or more embodiments of the present disclosure.

Electrical feedthrough assemblies of the present disclosure may be used to provide electrical connections between well equipment, such as between well equipment (e.g., a tree or other manifold or valve system) and a wellhead. For example, according to one or more embodiments, FIG. 5 illustrates a cross-sectional view of the electrical feedthrough assembly 100, as described in FIG. 4, connected to a tubing hanger assembly 200 in in accordance with the present disclosure. The tubing hanger assembly 200 may include a tubing hanger 201 and a tree 203 coupled to a wellhead or tubing head 202. Additionally, the tubing head 202 may have a connector 204 to connect the tubing hanger assembly 200 in a subsea environment. In a non-limiting example, the lower assembly 101 may be connected to the tubing hanger 201 by landing the protrusions 124 of the upper housing 117 on an inner load shoulder 225 of the tubing hanger 201. With the lower assembly 101 landed in the tubing hanger 201, the upper assembly 102 may be within the tree 203. It is further envisioned that the first ferrule connector 104 may be used to couple the first end 105 of the lower assembly 101 to a tubing hanger connector of the tubing hanger 201. In some embodiments, the second ferrule connector 111 may be used to couple the first end 112a of the upper assembly 102 to a subsea tree connector of the tree 203.

Electrical feedthrough assemblies, according to embodiments herein, are apparatuses that include multiple conductors within a lower assembly and upper assembly, and may include a piston with one dielectric fluid in the upper assembly to compensate for motion and thermal expansion. Using piston compensated dielectric volumes as described herein removes the need for elastomeric bladder compensation systems, and thus, electrical feedthrough assemblies of the present disclosure may include no environment compressible bladders installed within the multiple components. The elimination of environment compressible bladders and the need for multiple fluids in the electrical feedthrough assembly significantly improves the operational safety, reliability, and longevity during drilling, completions, production, and work-over operations, while providing continuous power through the electrical feedthrough assembly. Further, a pin end of the upper assembly is inserted into an opening of the lower assembly to conductively connect a conductor of the lower assembly to a conductor of the upper assembly. In addition, one or more glass-to-metal seals and metal-to-metal seals, along with insulating (e.g., PEEK) molding, may be used to environmentally isolate the conductors of the electrical feedthrough assembly. Furthermore, other instruments and devices, including without limitation, sensors and various valves may be incorporated within the electrical feedthrough assembly.

Conventional electrical feedthrough devices for subsea power distribution in the oil and gas industry are typically isolated conductors with various fluid profiles within each bladder of said conventional electrical feedthrough devices. Conventional methods may include an extensive layout and arrangement to ensure the conductors may be properly isolated and effective within said conventional electrical feedthrough devices. In some instances, conventional electrical feedthrough devices are manufactured to include multiple slots and chambers used to hold the bladders with various fluid profiles and an apparatus to make sure the various fluid profiles do not mix. Such conventional electrical feedthrough devices may be more expensive to manufacture because of the extra machining needed to account for the various fluid profiles. Further, the use of bladders with various fluid profiles may increase the potential for gas and cycling build-up within the conventional electrical feedthrough devices as well as leak paths to the environment. Additionally, conventional methods merely use elastomer seals which may cause the conventional electrical feedthrough devices to consistently fail an ohms test. This additional need for bladders with various fluid profiles and elastomer seals, increases the number of leak paths, adds to manufacturing and installation costs, and decreases the operational safety.

Electrical feedthrough assemblies are often used for assisting in providing power and electricity to well devices. Examples of electrical feedthrough assemblies may be used for drilling, completion applications, including natural flow, gas lift, and artificial lift systems in onshore and offshore wells and to continue producing for conventional and unconventional wells. Examples of electrical feedthrough assemblies, according to embodiments herein, may include a two-piece assembly for nominal wellhead sizes ranging from 7 1/16 inches to 11 inches and above, and with any power range required for various well operations. Achieving a successful conductor connection between an electrical feedthrough assembly and a tubing hanger is an important part of a well operation. Additional challenges further exist in a subsea environment for safely conductively connecting the electrical feedthrough assembly to the tubing hanger while both minimizing costs and providing reliability for future changes to the overall layout of a field or well.

Accordingly, one or more embodiments in the present disclosure may be used to overcome such challenges as well as provide additional advantages over conventional methods of retention, as will be apparent to one of ordinary skill. In one or more embodiments, an electrical feedthrough assembly may be safer, faster, and lower in cost as compared with conventional methods due, in part, to multiple electrical contacts within the electrical feedthrough assembly conductively connecting conductors from a lower and upper assembly of the electrical feedthrough assembly. Additionally, the electrical feedthrough assembly may comprise a piston (with one dielectric fluid) and pin end within the upper assembly to aid in conductively connecting the conductor from the lower assembly to the conductor of the upper assembly to form a continuous conductor that requires no need for bladders with various fluid profiles, and thus, relaxing control tolerances and improving manufacture (e.g., reduced cost and reduced time to manufacture). Overall the electrical feedthrough assembly may minimize product engineering, risk associated with electrical feedthrough assembly, reduction of assembly time, hardware cost reduction, and weight and envelope reduction.

Furthermore, methods of the present disclosure may include use of the electrical feedthrough assembly (100, 101, 102) and other structures, such as in FIGS. 2-5 for providing power to subsea devices. Because methods disclosed herein may apply to any of the embodiments, reference numbers are not referenced to avoid confusion of the numbering between the different embodiments.

According to embodiments of the present disclosure, a lower assembly of an electrical feedthrough assembly may be coupled to a tubing hanger. In a non-limiting example, a first ferrule connector inserted into an opening of a lower housing of the lower assembly may be connected to a tubing hanger connector such that a conductor of the lower assembly extends into the tubing hanger. Additionally, an electrical penetrator may be used to aid in continuing the conductor into the lower assembly. Next, an upper assembly of the electrical feedthrough assembly may be landed on the lower assembly. In a non-limiting example, a pin end at a first end of the upper assembly may be inserted into an opening of an upper housing of the lower assembly opposite the end of the first ferrule connector. Further, a shoulder of the upper assembly abuts and is flush onto a shoulder of lower assembly. By inserting the pin end of the upper assembly into the lower assembly, a conductor connector of the conductor in the lower assembly may extend into the upper assembly though the pin end to contact a first electrical contact. In addition, a second ferrule connector inserted into an opening at the second end of lower assembly may be connected to a subsea tree.

In some embodiments, a piston provided with the upper assembly may be actuated to conductively connect a first conductor of the lower assembly to a second conductor of the upper assembly. Upon actuation, the first conductor connector of the first conductor contacts a first electrical contact, and a second conductor of the upper assembly contacts a second electrical contact. The first electrical contact and the second electrical contact may be connected via a wire. Further, a dielectric fluid may be provided within the chamber of the piston to isolate and insulate the conductors as well as lubricating the piston. At a second end of the upper assembly, the second conductor may be connected to a power/electrical source such that power/electricity may be provided to the electrical feedthrough assembly. Furthermore, lengths of the conductors in the lower and upper assemblies may be insulated with insulating (e.g., PEEK) molding.

Additionally, glass bodies may be provided on the conductors in the lower and upper assemblies. It is further envisioned that glass-to-metal seals may be provided to seal the glass bodies from metal parts. In addition, metal-to-metal seals may be provided to seal any metal parts within the electrical feedthrough assembly. With the electrical feedthrough assembly attached between the tubing hanger and subsea tree, power/electricity may travel from a source (e.g., at the seabed, platform, or onshore), via cables or wires, to the conductors of the electrical feedthrough assembly such that power/electricity may be provided to subsea devices.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. An electrical feedthrough assembly, comprising:
   a lower assembly having a first end and a second end, wherein the lower assembly comprises:
      an outer body with a lower housing and an upper housing disposed within a bore of the outer body,
      wherein the lower housing extends axially outward from the outer body of the lower assembly to form the first end,
      wherein the upper housing extends axially outward from the outer body of the lower assembly to form the second end, and
      a first conductor extending from the lower housing to the upper housing, wherein at least one portion of the first conductor is enclosed in a first insulator; and
   an upper assembly having a first end and a second end, wherein the upper assembly is coupled to the lower assembly, wherein the upper assembly comprises:
      an outer body with a pin end at the first end, wherein the pin end is inserted into an opening at the second end of the lower assembly,
      a main body connected to the outer body of the upper assembly,
      a second conductor disposed within the main body, wherein at least one portion of the second conductor is enclosed in a second insulator,
      a channel in the outer body of the upper assembly open to an outside of the outer body of the upper assembly and a chamber within the outer body of the upper assembly,
      a piston disposed within the channel and configured to fluidly isolate the chamber from the outside of the outer body of the upper assembly,
      a shuttle pin provided within the outer body of the upper assembly configured to move axially between an upper position at least partially within the chamber and a lower position proximate the pin end, and
      a dielectric fluid provided within the chamber,
   wherein the piston is movable within the channel in response to a pressure differential between the dielectric fluid and the outside of the outer body of the upper assembly, such that the first conductor is conductively connected to the second conductor.

2. The electrical feedthrough assembly of claim 1, wherein an end face at the first end of the upper assembly abuts an internal shoulder within the opening at the second end of the lower assembly.

3. The electrical feedthrough assembly of claim 1, wherein the first insulator and the second insulator are formed from an insulating molding.

4. The electrical feedthrough assembly of claim 1, wherein a side of the outer body of the upper assembly adjacent to the piston is exposed to a surrounding environment.

5. The electrical feedthrough assembly of claim 1, wherein protrusions of the upper housing abut a load shoulder of the outer body of the lower assembly, and wherein threads of the upper housing are threaded to threads of the outer body of the lower assembly.

6. The electrical feedthrough assembly of claim 5, wherein the lower housing is coupled to the upper housing.

7. The electrical feedthrough assembly of claim 1, wherein the upper assembly comprises a plurality of electrical contacts.

8. The electrical feedthrough assembly of claim 7, wherein the length of the first conductor is in contact with a first electrical contact of the plurality of electrical contacts.

9. The electrical feedthrough assembly of claim 8, wherein the second conductor is in contact with the first electrical contact via a wire.

10. The electrical feedthrough assembly of claim 7, wherein the plurality of electrical contacts are connected together by wires.

11. The electrical feedthrough assembly of claim 1, further comprising at least one electrical penetrator in each of the lower assembly and the upper assembly.

12. The electrical feedthrough assembly of claim 1, further comprising at least one glass-to-metal seal and at least one metal-to-metal seal within each of the lower assembly and upper assembly.

13. The electrical feedthrough assembly of claim 1, wherein an extension of the main body is inserted into a slot of the outer body of the upper assembly.

* * * * *